United States Patent Office 2,755,306
Patented July 17, 1956

2,755,306

PROCESS OF PREPARING 4,4'-THIO-BISRESORCINOL

Ralph G. D. Moore, Chenango Forks, N. Y., assignor to General Aniline & Film Corporation, New York, N. Y., a corporation of Delaware No Drawing. Application May 15, 1952,
Serial No. 288,061

7 Claims. (Cl. 260—609)

This invention relates to 4,4'-thiobisresorcinol (diresorcyl sulfide) and particularly to an improved process of preparing the same.

It is known that phenol and sulfur dichloride may be condensed in the presence of carbon disulfide at a low temperature to yield phenol sulfide. The yield of the phenol sulfide is low and the product is very impure and requires extensive purification. Phenol sulfides can also be prepared by condensing phenols, alkyl phenols, and sulfur dichloride in the presence of ethylene chloride at a temperature ranging from 80 to 100° C. In the latter process a mixture of sulfides, disulfides, and polymeric bodies are obtained and fraction distillation must be resorted to to separate the crude mixture into the desired products.

Bis-4-resorcinol sulfide (4,4'-thiobisresorcinol) has been prepared by Dunning et al., J. A. C. S. 53, pages 3466–9 (1931), by dropping a carbon disulfide solution of sulfur dichloride into an ether solution of resorcinol. This process not only employs temperatures below freezing, i. e., at about $-10°$ C., which are costly to maintain in commercial operations, but also utilizes a poisonous solvent, carbon disulfide. Moreover, despite the low temperatures employed, considerable degradation of the final product occurs.

4,4'-thiobisresorcinol has been isolated by Lefèvre and Desgrez (Compt. rend. 198, 1791-3 [1934]) from the reaction products of sulfur, resorciol, sodium carbonate, and glycerol. The method involved is extremely complicated, time consuming, and expensive. The yields obtained are very small and the final product contains several impurities, principally diresorcyl disulfide. 4,4'-thiobisresorcinol has also been prepared by reacting resorcinol and sulfur dichloride in an alkyl ester of a lower fatty acid, i. e., ethyl acetate, at room temperature followed by distillation of the crude reaction mixture. This method has several disadvantages in that the addition of the sulfur dichloride requires very careful control. If it is added too fast or if the temperature is raised above 25° C., a blackening of the reaction mixture occurs, which leads to an undesirable colored product. Moreover, the yields obtained are very small, ranging from 0 to 10%.

It is an object of the present invention to provide an improved process of preparing 4,4'-thiobisresorcinol in satisfactory yields and of higher purity without the presence of degradation products.

Other objects and advantages will become apparent from the following description.

The foregoing objects are accomplished by treating a solution of resorcinol with sulfur dichloride or with a solution of sulfur dichloride in an alkyl ester of a lower fatty acid at a temperature not exceeding 15° C., e. g., between 0° and 15° C., for a period of time ranging from ½ to 1½ hours. The cold reaction solution is then run into a stirred aqueous solution of alkali, such as, for example, sodium, potassium, or lithium carbonate, in an amount sufficient to neutralize the by-product hydrogen chloride, at a temperature not exceeding 25° C., preferably between 15° and 20° C. The lower aqueous layer of the neutralized solution is then removed, and the lower alkyl ester solution distilled under pressure ranging from 100 mm. to 300 mm. to a bath temperature ranging between 70–90° C., and an internal temperature of 20–60° C. An amount of water approximately equal to ½ the original volume of the ester is added and the distillation continued to a bath temperature not exceeding 90° C. and an internal temperature not exceeding 60° C. under reduced pressure ranging from 100 to 300 mm. The distillation is ended when an appreciable amount of water collects in the receiver. The residual aqueous solution is then cooled to a temperature of about 30° C., seeded, and refrigerated overnight at a temperature of 0° to 5° C. The refrigerated slurry is then filtered and the crystals washed and dried. The yield of the 4,4'-thiobisresorcinol obtained ranges from 25 to 45%.

As examples of alkyl esters of lower fatty acids, which may be employed as solvents for sulfur dichloride and as solvents for resorcinol, the following may be mentioned:

Ethyl formate           Propyl acetate
Ethyl acetate           Isopropyl acetate
Ethyl propionate        Isoamyl acetate
Methyl butyrate         Isoamyl butyrate
Ethyl butyrate In practicing the improved process about two molecular equivalents of resorcinol are dissolved in a sufficient quantity of an alkyl ester of a lower fatty acid. A molecular equivalent in slight excess of sulfur dichloride dissolved in an alkyl ester of a fatty acid is then added to the resorcinol solution at a temperature not exceeding 15° C. The 4,4'-thiobisresorcinol is isolated by one of the following methods: (A) Neutralization of the by-product hydrogen chloride by adding the reaction solution to a proper amount of any aqueous alkali solution at a temperature not exceeding 25° C., followed by removal of the solvent ester by distillation, and finally by crystallization of the distillation residue from water, and (B) removal of the solvent ester and by-product hydrogen chloride by evaporation under reduced pressure at a temperature not exceeding 25° C., followed by crystallization of the residue from water.

The foregoing process steps will be more fully described in conjunction with the following examples. It is to be noted, however, that these examples are given by way of illustration and are not intended as being limitative of the invention claimed.

*Example I*

To a cooled stirred solution of 44 grams of technical resorcinol in 200 ml. of ethyl acetate, a solution of 20.6 grams of sulfur dichloride in 45 ml. of ethyl acetate was added over several minutes at a temperature not exceeding 15° C. After about 1 hour, the cold reaction solution was run into a stirred solution of 25 grams of sodium carbonate, monohydrate, in approximately 150 ml. of water at a temperature ranging between 15 and 20° C. The lower aqueous layer, at a pH of about 7, was removed and the ethyl acetate solution distilled at about 200 mm. pressure to a bath temperature of 80–90° C. 100 ml. of water were then added and the distillation continued until the water distilled over. The residual aqueous solution was cooled, seeded, refrigerated overnight at a temperature of about 5° C. and filtered. The washed and dried product melted at a little above 190° C. (uncorrected) and amounted to 18.3 grams, a yield of 36.6%.

*Example II*

To 44 grams of resorcinol dissolved in 200 ml. of ethyl acetate there were added with stirring over about 15 minutes 20.6 grams of sulfur dichloride. The temperature was maintained below 15° C., by external cooling. After about 1 hour the solution was evaporated under reduced pressure to an internal temperature of about 20° C. at a pressure of 300 mm. The receiver was then removed, 30 ml. of water were added, and evaporation continued under reduced pressure for 45 minutes. The residue was then rinsed out with water and refrigerated after being seeded. The next day the product was filtered, washed, and dried under reduced pressure. Form the mother liquor a second crop was obtained by concentration under reduced pressure. The total yield was 12.6 grams or 25.2%.

The utilization of ethyl formate, ethyl propionate, methyl butyrate, isoamyl acetate, and the like as solvents for the resorcinol and sulfur dichloride gave the same satisfactory results as in Examples I and II.

I claim:

1. In the process of preparing 4,4'-thiobisresorcinol, the improvement which comprises reacting sulfur dichloride, and a solution of rescorinol in an alkyl ester of a fatty acid containing up to 4 carbon atoms, said alkyl group in the ester containing up to 5 carbon atoms, at a temperature not exceeding 15° C., neutralizing the reaction solution with an alkali, removing the ester at a temperature ranging from 20 to 60° C., and crystallizing the 4,4'-thiobisresorcinol from water.

2. In the process of preparing 4,4'-thiobisresorcinol,, the improvement which comprises reacting a solution of resorcinol and a solution of sulfur dichloride in an alkyl ester of a fatty acid containing up to 4 carbon atoms, said alkyl group in the ester containing up to 5 carbon atoms, at a temperature not exceeding 15° C., neutralizing the reaction solution with an alkali, removing said ester at a temperature ranging from 20 to 60° C., and isolating the 4,4'-thiobisresorcinol by crystallization from water.

3. The process according to claim 2, wherein the alkyl ester of a lower fatty acid is ethyl acetate.

4. The process according to claim 2, wherein the alkyl ester of a lower fatty acid is ethyl formate.

5. The process according to claim 2, wherein the alkyl ester of a lower fatty acid is ethyl propionate.

6. The process according to claim 2, wherein the alkyl ester of a lower fatty acid is methyl butyrate.

7. The process according to claim 2, wherein the alkyl ester of a lower fatty acid is isoamyl acetate.

References Cited in the file of this patent

Dunning et al.: J. Am. Chem. Soc., vol. 53, pages 3466–3469 (September 1931).

Morton: Laboratory Technique in Organic Chemistry, 1938, McGraw-Hill, page 153.